US007044645B2

(12) United States Patent
Yamamoto

(10) Patent No.: US 7,044,645 B2
(45) Date of Patent: May 16, 2006

(54) RETAINER WITH ROTATIONALLY SYMMETRIC POCKETS

(75) Inventor: Takuya Yamamoto, Miyota-Machi (JP)

(73) Assignee: Minebea Co. Ltd., (JP)

( * ) Notice: Subject to any disclaimer, the term of this patent is extended or adjusted under 35 U.S.C. 154(b) by 481 days.

(21) Appl. No.: 10/452,629

(22) Filed: May 30, 2003

(65) Prior Publication Data

US 2004/0037481 A1 Feb. 26, 2004

(30) Foreign Application Priority Data

May 30, 2002 (JP) .............................. 2002-157430

(51) Int. Cl.
*F16C 33/38* (2006.01)
(52) U.S. Cl. ........................ 384/531; 384/523; 384/533
(58) Field of Classification Search ................ 384/523, 384/526, 527, 531, 533; 29/898.067
See application file for complete search history.

(56) References Cited

U.S. PATENT DOCUMENTS 4,225,199 A 9/1980 Earsley 6,276,836 B1 8/2001 Suzuki et al.

FOREIGN PATENT DOCUMENTS

| EP | 0992696 | 4/2000 |
| EP | 1275865 | 1/2003 |
| EP | 1355072 | 10/2003 |
| GB | 1594582 | 7/1981 |
| JP | 57087827 U | 5/1982 |
| JP | 2000-039024 | 2/2000 |
| JP | 2000266062 | 9/2000 |
| JP | 2001-280347 | 10/2001 |

OTHER PUBLICATIONS

European Search Report dated Jun. 28, 2005.

*Primary Examiner*—Thomas R. Hannon
(74) *Attorney, Agent, or Firm*—Schulte Roth & Zabel, LLP; Joel E. Lutzker; Anna Vishev

(57) ABSTRACT

A retainer having an annular body with a plurality of pockets. Each pocket has a pair of corner portions that form an opening. The pockets have a spherical inside surface and a pair of tapered surfaces. Alternatively, the pockets can have a spherical inside surface and at least two pairs of tapered surfaces. The geometry of the pockets including the corner portions has rotational symmetry. The retainer improves lubricant retention, and reduces vibration, noise and non-repeating run out.

11 Claims, 6 Drawing Sheets

PRIOR ART

RETAINER WITH ROTATIONALLY SYMMETRIC POCKETS

CROSS-REFERENCE TO RELATED APPLICATIONS

This application claims priority from the commonly-assigned Japanese Patent Application No. 2002-157430, filed on May 30, 2002 entitled "RETAINER".

BACKGROUND OF THE INVENTION

1. Field of the Invention

The present invention relates to a retainer for retaining a rolling member within a ball bearing race. More particularly, this invention relates to a retainer with a rotationally symmetric pocket for which it is easy to manufacture a molding tool.

2. Description of the Prior Art

In bearings using rolling members, the escaping of the rolling members and the rubbing friction due to contact between the adjacent rolling members is prevented by using a retainer. The use of the retainer allows the rolling members to rotate within the race of the bearing and at the same time keeps them separated by a specified fixed distance.

FIG. 10 shows a conventional retainer 1 for use in a ball bearing. The retainer 1 is an annular member with a plurality of pockets 3 (only one pocket is shown in FIG. 10), which house balls 2. The balls 2 are packed into a race between an inner ring and an outer ring of the ball bearing (not shown). The balls 2 rotate in the race of the ball bearing. An inside surface 4A of the pocket 3 is of a spherical shape that matches the curvature of the surface of the balls 2. Generally, an inner diameter D1 of the pockets 3 is set to be slightly larger than the diameter D of the balls 2, for example, D1=1.03D. Since D1 is larger than D a gap C is formed between the balls 2 and the inside surface of the pockets 3. This gap C can hold a lubricant.

Use of the retainer 1 prevents contacts between the adjacent balls 2, and enables smooth rotation of the balls 2. As a result the frictional torque and frictional heat is suppressed and the inner and outer rings rotate smoothly relative to one another.

When the conventional retainer 1 is used, the gap C is formed between the balls 2 and the pockets 3. The gap C holds the lubricant. But when the rotational speed exceeds 10,000 rpm, irregular fluctuations occur in the gap C due to, for example, self-excited vibration of the balls 2. The irregular fluctuations in the gap C results in a pumping action which in turn causes fluctuation in the lubricant's pressure and fluctuation of shear resistance due to the lubricant's viscosity. As a result, the rotation of the ball bearing becomes unstable, the non-repeating run out (NRRO) increases, vibration and noise increase and lubricant leaks from the gap C.

The greater densification of the recording media and the increases in rotary speeds of the drive devices such as computer hard disks, magnetic disks and optical disks have created a demand for spindle motor bearings with high rotational accuracy, low friction, low noise and long life to drive these recording disks.

One way of reducing the vibrations is by making the gap C smaller. But when the gap C is made smaller, the contact surface between the balls 2 and the inside surface 4A of the pockets 3 increases. The increase in contact surface reduces the amount of lubricant held in the gap C and increases the rotary torque.

The above problem is solved by U.S. Pat. No. 4,225,199 and Japanese Utility Model S.57-87827 by making the inside surface 4A of the retainer pockets 3 of multi-faceted shape. The multi-faceted shape provides a fixed gap between the pocket inside surface 4A and the balls 2 and point contact between the balls 2 and the retainer 1, thereby, increasing lubricant retention and resulting in smooth rotation.

However, since the pocket inside surface 4A disclosed by the above mentioned prior art references is multifaceted in shape, the mold used to form the retainer is complex in shape. Since the manufacturing steps, such as cutting, grinding and other machining are more complicated for a complex shape, the mold is costlier to manufacture. Therefore, there is a need to provide a ball bearing retainer which will increase lubrication, permit smooth rotation by reducing vibration and noise and can be easy and cost effective to manufacture.

SUMMARY OF THE INVENTION

This invention is directed to a retainer that overcomes the shortcomings of the prior art and at the same time improves lubricant retention and reduces vibration, noise and non-repeating run out. The retainer has an annular body having a plurality of pockets. Each pocket has a pair of corner portions that form an opening. In one embodiment, the pocket has a spherical inside surface and a pair of tapered surfaces. The geometry of the pocket including the corner portions has rotational symmetry. In another embodiment the pocket has a spherical inside surface and at least two pairs of tapered surfaces. Here too, the geometry of the pocket including that of the corner portions has rotational symmetry. The rotational symmetry of the pocket geometry in both embodiments allow the mold part to form the pocket in each instance to be machined with high machining accuracy using a single rotary axis.

Further features and advantages will appear more clearly on a reading of the detailed description, which is given by way of example only and with reference to the accompanying drawings.

DETAILED DESCRIPTION

Figure 2:
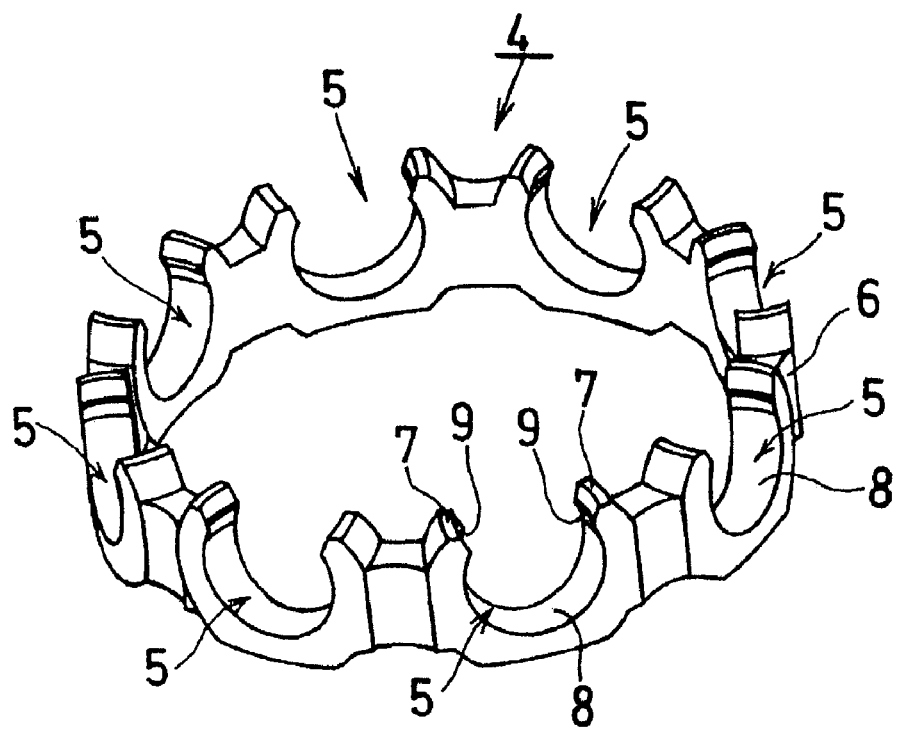
FIG. 2 is a perspective view of a retainer according to the first embodiment.
Figure 3:
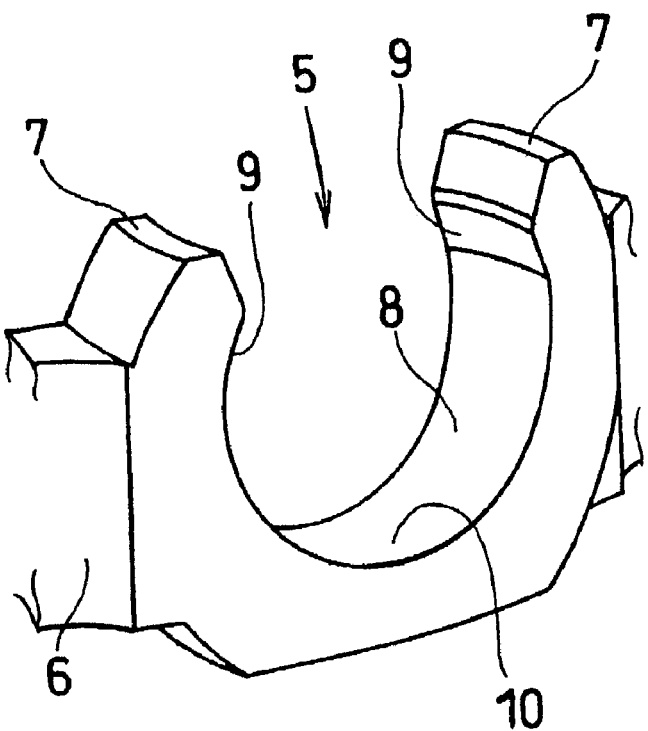
FIG. 3 is an enlarged view of a pocket of the retainer of FIG. 2.

FIGS. 2 and 3 show a "crown" type retainer 4 for holding multiple balls (not shown). The balls are rolling members packed into a race formed between the outer ring and inner ring of a radial ball bearing (not shown). Multiple pockets 5, each of which retains a ball, are disposed at equal intervals along the circumference of the retainer 4. The number of the pockets 5 varies with the number of balls in the bearing.

Each pocket 5 has a pair of corner portions 7 which protrude from one edge of an annular member 6. Each pocket 5 is open in three directions—the inner perimeter and the outer perimeter of the annular member 6 and one edge of the annular member 6. An inside surface 8 of the pocket 5 is of spherical shape (i.e., concave surface shape) that corresponds to the ball surface. When the ball is pressed into the opening at one edge of the pocket 5, the corner portions 7 spread open allowing the ball to fit into the pocket 5 and rotate therein.

Figure 1:
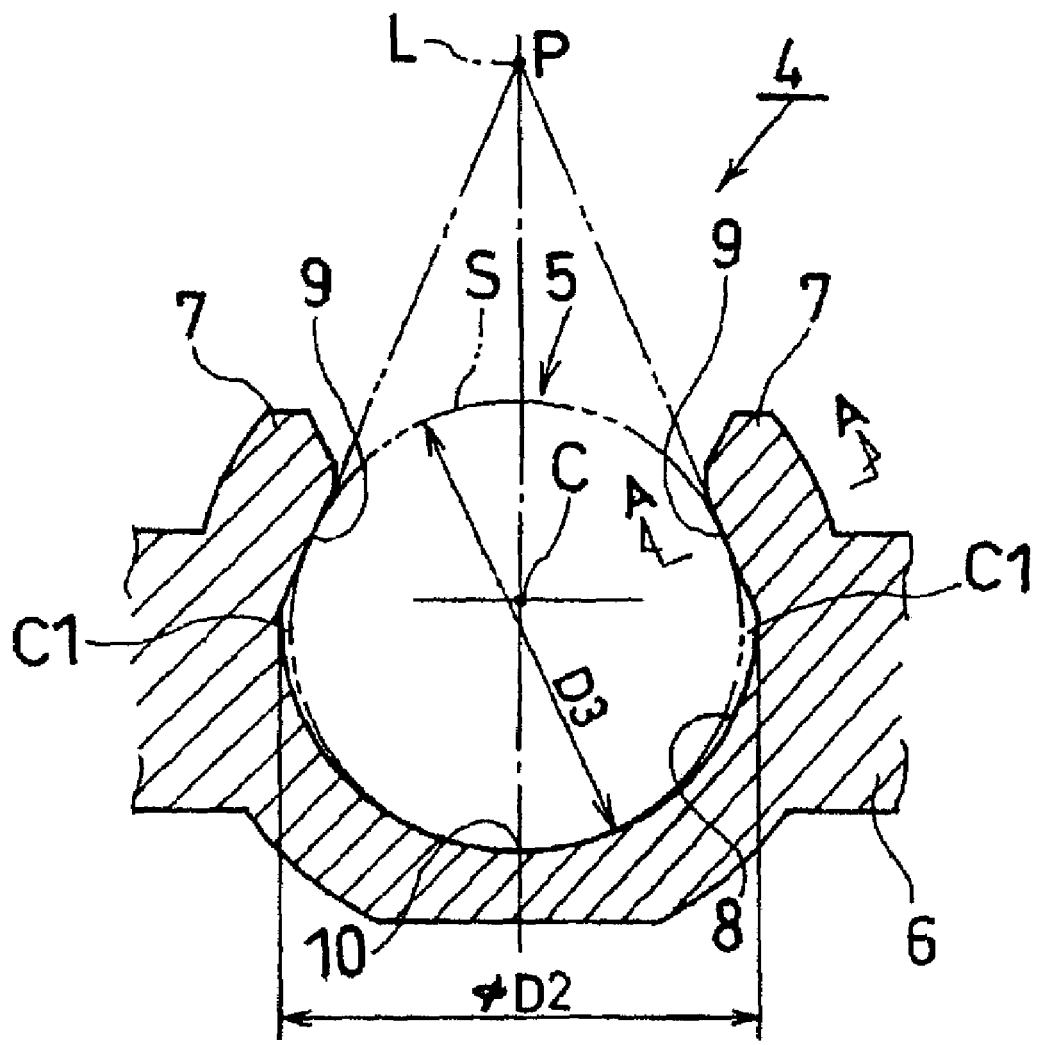
FIG. 1 is a sectional view of a retainer pocket portion according to the first embodiment.

FIG. 1 shows a cross-sectional view of one of the pockets 5 of retainer 4. The diameter D2 of the pocket 5 spherical inside surface 8 is larger than the diameter D of the ball, preferably D2=1.03D–1.06D. A pair of tapered surfaces 9 is formed on the inside surface of the pair of corner portions 7. The planes of the faces of the tapered surfaces 9, when extended in space, meet at apex P. A line connecting the apex P and center C of the inside surface 8 bisects the angle formed at the apex P. The tapered surfaces 9 fall within the circumference of a circle with diameter equal to that of the inside surface 8. Thus, a spherical surface S to which tapered surfaces 9 are tangential has a diameter slightly larger than the ball diameter D but smaller than the diameter D2 of the inside surface 8. The diameter D3 of the spherical surface S may be set at D3=1.005D–1.025 D; preferably at about D3=1.016D–1.020D.

Figure 4:
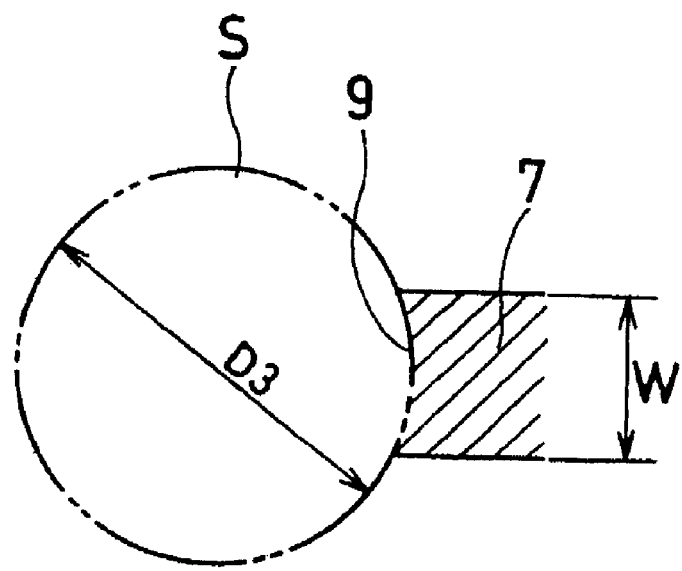
FIG. 4 is a section through line A—A in FIG. 1.

The tapered surfaces 9 and a bottom portion 10 of the inside surface 8 make contact with the ball. (See FIG. 1.) Thus, the balls are supported at three points. This allows the balls to rotate and suppresses the self-excited vibrations at high speeds. A fixed gap C1 is formed between the pocket 5 inside surface 8 and the ball. The fixed gap C1 retains the lubricant and reliably supplies the same to the rubbing surfaces thereby increasing lubrication and reducing vibration, noise and NRRO. FIG. 4 shows a width W of the pocket 5 into which a ball fits. The width W is about 15% smaller than the width of the conventional common retainer pocket of same size. The reduced width W results in shortening the length of contact between the balls and the tapered surfaces 9 and the bottom portion 10 of the pocket 5. The shorter length of contact results in reduced friction and decreased bearing rotary torque, which in turn allows reduction in the diameter of the spherical surface S. The reduction in the diameter of the spherical surface S results in an accurate positioning of the balls. The retainer 4 can be manufactured by injection molding a heat-platicizable resin such as nylon 66 or polyphenylene sulfide (PPS).

Figure 5:
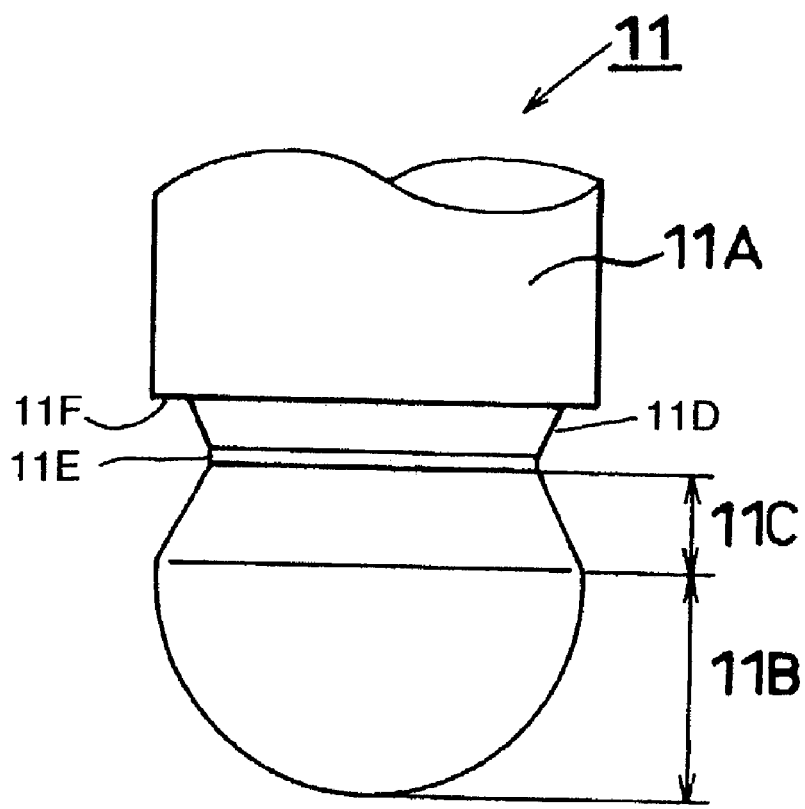
FIG. 5 is an enlarged view of a mold part for molding the pocket portion of the retainer of FIG. 2.
Figure 6:
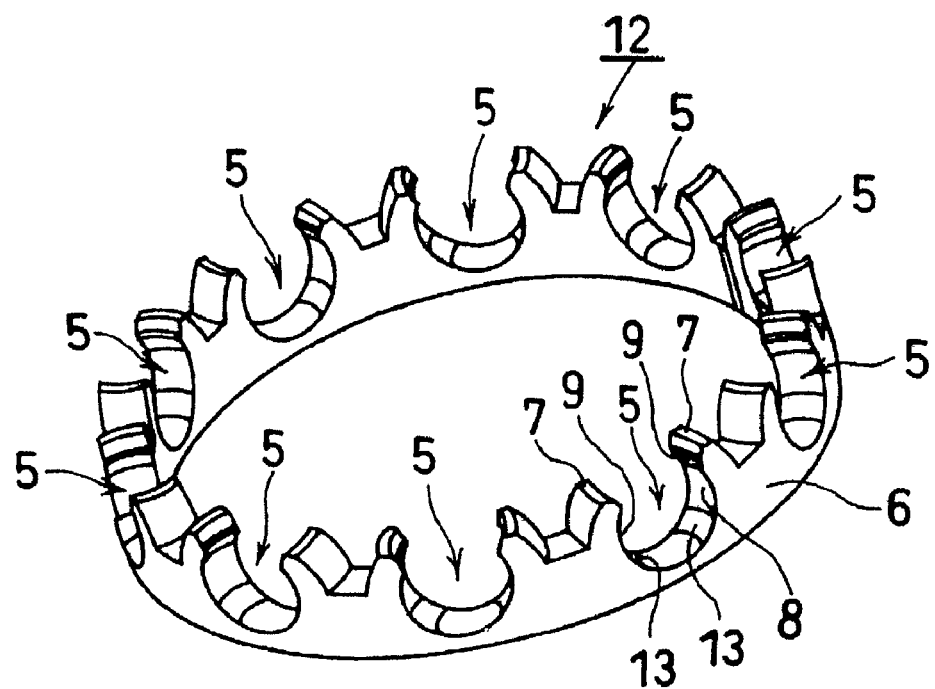
FIG. 6 is a perspective view of the retainer according to the second embodiment.
Figure 7:
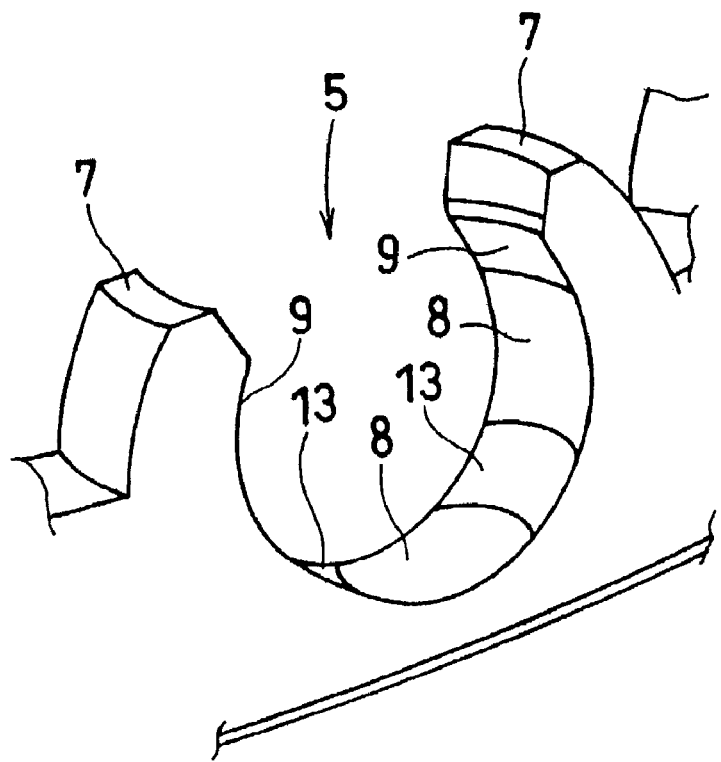
FIG. 7 is an enlarged view of a pocket of the retainer of FIG. 6.
Figure 8:
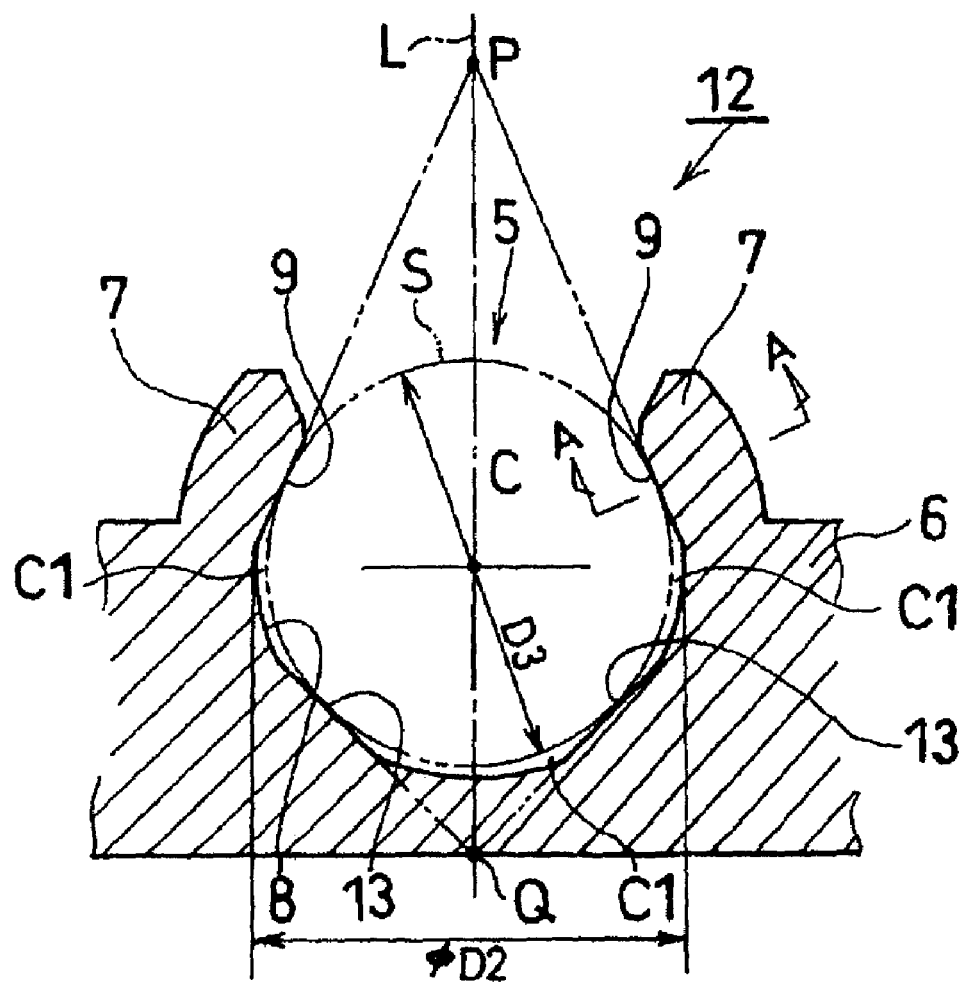
FIG. 8 is an enlarged sectional view of a pocket of the retainer of FIG. 6.

FIG. 5 shows a mold part 11. The mold part 11 is part of an injection molding tool that can be used to form the pocket 5 of the retainer 4. The mold part 11 has a columnar main unit 11A. Connected to the columnar main unit 11A is a tapered part 11D. A cylindrical part 11E is connected to the tapered part 11D. The larger diameter of the tapered part 11D is smaller than the diameter of the columnar main unit 11A. Thus, an annular ring 11F is formed on one end of the columnar main unit 11A. The diameter of the columnar main unit 11A is chosen to be of such size that the top of the corner portions 7 is formed by the annular ring 11F. The tapered part 11D and the cylindrical part 11E form the entrance geometry at the opening of the pocket 5. A tapered portion 11C is connected to the cylindrical part 11E and a spherical portion 11B is connected to the tapered portion 11C. The tapered portion 11C forms the tapered surfaces 9 and the spherical portion 11B forms the inside surface 8 of the pocket 5. The bottom portion 10 of the pocket 5 inside surface may have a planer shape. To impart the planer shape to the bottom portion 10, spherical portion 11B will be machined to have a planer shape at its free end. The geometry of the mold part 11 has rotational symmetry and can be easily machined with high machining accuracy using a single rotary axis. Thus, the cost of manufacturing the mold part 11 is lower. The retainer 4 can be made using a molding tool having the above described geometry.

In use, a specified number of balls are inserted in the retainer 4. The retainer 4, including the balls is placed between an outer ring and an inner ring of a bearing. Lubricant is then injected into the bearing, and a shield is fitted to prevent the splattering of lubricant and entry of foreign objects in the raceway of the bearing.

FIGS. 6–9 show a second embodiment of a "crown" type retainer 12. Only those portions of the retainer 12 that differ from the retainer 4 are described in detail.

The retainer 12 has a plurality of pockets 5 (10 pockets shown in FIG. 6) formed on an annular member 6. On an inside surface 8 of each of the pockets 5 is a pair of tapered surfaces 9 and an additional pair of tapered surfaces 13 is formed towards the bottom of the pocket 5. The planes of the faces of the tapered surfaces 9 and tapered surfaces 13, when extended in space, meet at apexes P and Q respectively. (See FIG. 8.) Both P and Q lie on a line drawn through center C of the inside surface 8. A spherical surface S makes contacts with the tapered surfaces 9 and the tapered surfaces 13. The diameter of the spherical surface S is slightly larger than the ball diameter D. The diameter $D_3$ of the spherical surface S in approximately $D_3$=1.005D–1.025D or preferably $D_3$=1.01D–1.020D. A dimension $D_2$ of an inside surface 8 is approximately $D_2$=1.03D–1.06D.

In the retainer 12, the balls are supported at 4 points by the tapered surfaces 9 and 13. A fixed gap C1 is formed between the ball and the inside surface 8 of the pocket 5, resulting in an action and effect similar to those described with reference to the first embodiment.

The retainer 12 may also be made with three or more pairs of tapered surfaces.

Figure 9:
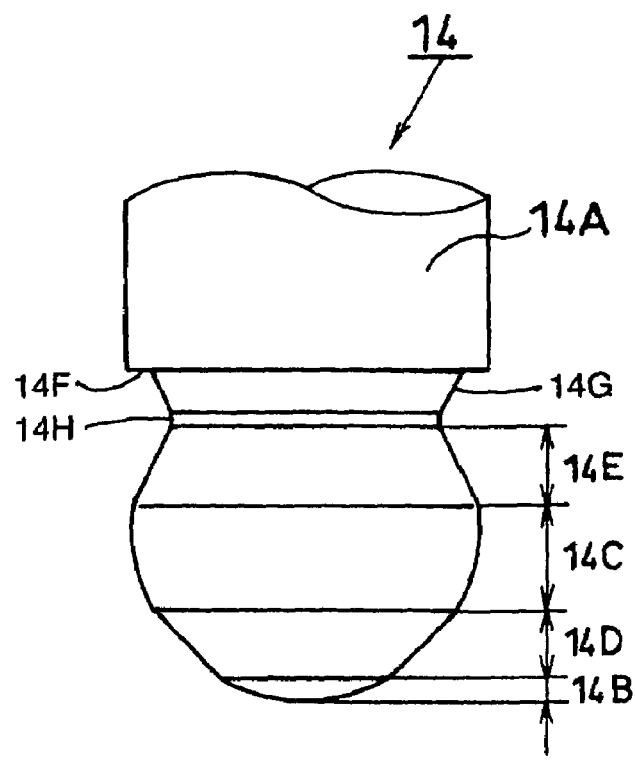
FIG. 9 is an enlarged view of a mold part for molding the pocket portion of the retainer of FIG. 6.
Figure 10:
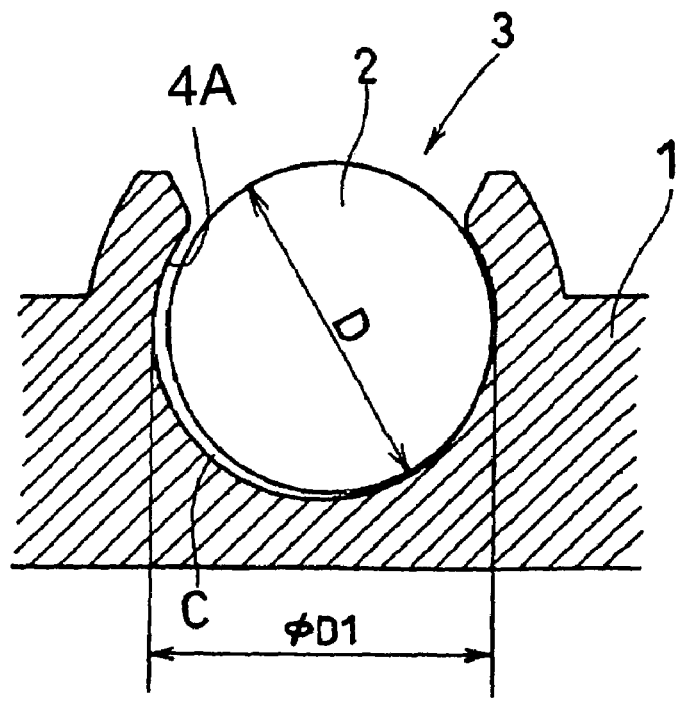
FIG. 10 is an enlarged sectional view of a conventional pocket portion.

FIG. 9 shows a mold part 14. The mold part 14 has a columnar main unit 14A, a tapered part 14G, a cylindrical part 14H and an annular ring 14F that are similar in form and function to the previously described columnar main unit 11A tapered part 11D, cylindrical part 11E and the annular ring 11F, respectively. The cylindrical part 14H is connected to a tapered part 14E, which in turn is connected to a spherical portion 14C. The spherical portion 14C is connected to a tapered part 14D, which in turn is connected to a spherical portion 14B. The tapered parts 14E and 14D form the tapered surfaces 9 and 13 respectively. The spherical portions 14B and 14C form the spherical inside surface 8. The geometry of the mold part 14A has rotational symmetry and can be easily machined with high dimensional accuracy using a single rotary axis. Thus, the cost of manufacturing the mold part 14 is lower. The retainer 12 can be made using a molding tool having the above described geometry and such retainer 12 would have all the advantages that were described with reference to retainer 4.

The embodiments described above are exemplary only. This disclosure is illustrating, but not limiting; further modifications will be apparent to one skilled in the art in light of this disclosure and are intended to fall within the scope of the appended claims.

What is claimed is:

1. A retainer comprising:
   an annular member;
   a plurality of pockets formed in the annular member;
   an inside surface formed in each of the pockets; and
   at least one pair of tapered surfaces formed in each of the pockets; wherein,
   the shape of the pockets has rotational symmetry, and the axis of rotational symmetry of the shape of the pockets is parallel to the rotational axis of the annular member.

2. The retainer of claim 1, wherein the diameter of the inside surface is larger than the diameter of a rolling member inserted in each of the pockets.

3. The retainer of claim 1, wherein a rolling member inserted in each of the pockets is supported by the tapered surfaces and the inside surface.

4. The retainer of claim 1, wherein the inside surface is spherical.

5. The retainer of claim 1, made from a material selected from a group consisting of nylon 66 and polyphenylene sulfide.

6. The retainer of claim 1, wherein the diameter of the inside surface is 1.03–1.06 times the diameter of a rolling member inserted in each of the pockets.

7. The retainer of claim 1, wherein the diameter of surface to which the pair of tapered surfaces are tangential is 1.016–1.02 times the diameter of a rolling member inserted in each of the pockets.

8. A retainer comprising:
   an annular member;
   a plurality of pockets formed in the annular member;
   an inside surface formed in each of the pockets; and
   at least two pairs of tapered surfaces formed in each of the pockets; wherein
   the shape of the pockets has rotational symmetry, and the axis of rotational symmetry of the shape of the pockets is parallel to the rotational axis of the annular member.

9. The retainer of claim 8, wherein the diameter of the inside surface is larger than the diameter of a rolling member inserted in each of the pockets.

10. The retainer of claim 8, wherein a rolling member inserted in each of the pockets is supported by the tapered surfaces.

11. The retainer of claim 8, wherein the inside surface is spherical.

* * * * *